United States Patent
Lee et al.

(10) Patent No.: US 11,067,324 B2
(45) Date of Patent: Jul. 20, 2021

(54) REFRIGERATOR AND CONTROL METHOD THEREFOR

(71) Applicant: LG Electronics Inc., Seoul (KR)

(72) Inventors: Namgyo Lee, Seoul (KR); Yonghyeon Cho, Seoul (KR); Jindong Kim, Seoul (KR); Sunghee Kang, Seoul (KR); Jihyun Im, Seoul (KR); Youngseung Song, Seoul (KR); Namgi Lee, Seoul (KR); Namsoo Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 325 days.

(21) Appl. No.: 16/087,925

(22) PCT Filed: Mar. 24, 2017

(86) PCT No.: PCT/KR2017/003233
§ 371 (c)(1),
(2) Date: Sep. 24, 2018

(87) PCT Pub. No.: WO2017/164712
PCT Pub. Date: Sep. 28, 2017

(65) Prior Publication Data
US 2020/0318882 A1 Oct. 8, 2020

(30) Foreign Application Priority Data

Mar. 24, 2016 (KR) .................. 10-2016-0035198
Mar. 22, 2017 (KR) .................. 10-2017-0036050

(51) Int. Cl.
*F25B 49/02* (2006.01)
*F25B 13/00* (2006.01)

(52) U.S. Cl.
CPC ............ *F25B 49/022* (2013.01); *F25B 13/00* (2013.01)

(58) Field of Classification Search
CPC ........ F25B 49/022; F25B 49/02; F25B 13/00; F25B 2600/112; F25B 2600/0253;
(Continued)

(56) References Cited

U.S. PATENT DOCUMENTS

2007/0227166 A1* 10/2007 Rafalovich ............... F25B 5/02
62/199
2011/0302938 A1* 12/2011 Lee .......................... F25D 29/00
62/89

(Continued)

FOREIGN PATENT DOCUMENTS

EP 1182410 2/2002
EP 2395304 12/2011
(Continued)

OTHER PUBLICATIONS

CN Office Action on Chinese Application No. 201780018881.1, dated Dec. 24, 2019, 10 pages (with English translation).
(Continued)

*Primary Examiner* — Emmanuel E Duke
(74) *Attorney, Agent, or Firm* — Fish & Richardson P.C.

(57) ABSTRACT

A control method for a refrigerator comprises: sensing a temperature of a first storage chamber; increasing an output of a first cooling fan if the temperature reaches a value greater than or equal to a second reference temperature; reducing the output of the first cooling fan if the temperature reaches a value less than or equal to a first reference temperature; increasing the output of the first cooling fan if a first reference time has passed after the temperature has reached the value or if the temperature reaches a first setting temperature between the first reference temperature and the second reference temperature; and reducing the output of the first cooling fan if a second reference time has passed after the output of the first cooling fan has been changed, or if the temperature reaches a preset second setting temperature (Continued)

between the first setting temperature and the first reference temperature.

16 Claims, 7 Drawing Sheets

(58) Field of Classification Search
CPC ..... F25B 49/025; Y02B 30/70; F25D 17/065; F25D 29/00
See application file for complete search history.

(56) References Cited

U.S. PATENT DOCUMENTS

| | | | |
|---|---|---|---|
| 2013/0167565 A1* | 7/2013 | Kim | F25D 29/00 62/89 |
| 2015/0168040 A1* | 6/2015 | Kang | F25D 17/065 62/66 |

FOREIGN PATENT DOCUMENTS

| | | |
|---|---|---|
| EP | 2505946 | 10/2012 |
| JP | 11183010 | 7/1999 |
| JP | 2001074354 | 3/2001 |
| KR | 100352536 | 9/2002 |
| KR | 100382503 | 5/2003 |
| KR | 1020070074353 | 7/2007 |
| KR | 1020110136101 | 12/2011 |
| KR | 101210751 | 12/2012 |
| KR | 101576686 | 12/2015 |

OTHER PUBLICATIONS

EP Supplementary Search Report in European Application No. EP17770682, dated Nov. 28, 2019, 12 pages.
International Search Report in International Application No. PCT/KR2017/003233, dated Jul. 17 2017, 4 pages.
KR Office Action in Korean Appln. No. 10-2017-0036050, dated Mar. 15, 2021, 14 pages (with English translation).

* cited by examiner

REFRIGERATOR AND CONTROL METHOD THEREFOR

CROSS-REFERENCE TO RELATED APPLICATIONS

This application is a National Stage application under 35 U.S.C. § 371 of International Application No. PCT/KR2017/003233, filed on Mar. 24, 2017, which claims the benefit of Korean Application No. 10-2017-0036050, filed on Mar. 22, 2017, and Korean Application No. 10-2016-0035198, filed on Mar. 24, 2016. The disclosures of the prior applications are incorporated by reference in their entirety.

TECHNICAL FIELD

The present invention relates to a refrigerator and a control method therefor.

BACKGROUND ART

Refrigerators are home appliances that store foods at a low temperature. A storage compartment is always maintained at a constant low temperature.

At present, in the case of household refrigerators, the storage compartment is maintained at a temperature within the upper and lower limit ranges on the basis of a set temperature. That is, the refrigerator is controlled through a method in which when the storage compartment increases to the upper limit temperature, a refrigeration cycle operates to cool the storage compartment, and when the storage compartment reaches the lower limit temperature, the refrigeration cycle is stopped.

Recently, a refrigerator has been developed in which an evaporator is installed in a freezing compartment and a refrigerating compartment. Such a refrigerator allows the refrigerant to flow to one evaporator of each of a freezing compartment and a refrigerating compartment and then to flow to the other evaporator.

A control method therefor are disclosed in Korean Patent Registration No. 10-1576686 (Registered on Dec. 4, 2016) that is a prior art document.

In the control method of a refrigerator disclosed in the prior art document, after a refrigerating compartment valve and a freezing compartment fan operate to cool the refrigerating compartment, a freezing compartment valve and a freezing compartment fan operate to cool the freezing compartment.

Also, after the cooling of the freezing compartment is completed, the compressor is stopped. In this state, the freezing compartment fan rotates to reduce a temperature of the freezing compartment by latent heat of evaporation.

However, in case of the prior art document, although the temperature of the freezing compartment decreases in the state in which the compressor is stopped, there is a problem that the temperature of the refrigerating compartment does not decrease.

Generally, the freshness of foods stored in the refrigerating compartment is higher as a variation in temperature of the refrigerating compartment is smaller. If the freshness of the foods is high, a storage period of the foods may increase.

However, in the case of the prior art document, when the compressor is stopped, the temperature of the refrigerating compartment continuously increases until the compressor operates again for cooling the refrigerating compartment. When the compressor operates again, the temperature of the refrigerating compartment decreases to increase in variation of the temperature. Thus, there is a problem that the freshness of the foods stored in the refrigerating compartment is deteriorated.

DISCLOSURE OF THE INVENTION

Technical Problem

An object of the present invention is to provide a refrigerator which is controlled to reduce a variation in temperature of a storage chamber so as to improve freshness of a stored object and a control method therefor.

An object of the present invention is to provide a refrigerator that is capable of reducing an operation time of a compressor to reduce power consumption and a control method therefor.

Technical Solution

In a method for controlling a refrigerator according to one aspect, which includes a compressor compressing a refrigerant, a first evaporator receiving the refrigerant from the compressor to generate cold air for cooling a first storage chamber, a first cooling fan for supplying the cold air into the first storage chamber, a second evaporator receiving the cold air from the compressor to generate cold air for cooling the second storage chamber, a second cooling fan for supplying the cold air into the second storage chamber, and a valve selectively opening one of a first refrigerant passage connected between the compressor and the first evaporator to allow the refrigerant to flow therebetween and a second refrigerant passage connected between the compressor and the second evaporator to allow the refrigerant to flow therebetween, cooling of the first storage chamber and cooling of the second storage chamber alternately operate.

The method for controlling the refrigerator includes: a step of sensing a temperature of the first storage chamber; a step of increasing an output of the first cooling fan when the sensed temperature of the first storage chamber reaches a value that is equal to or above a first reference temperature for the first storage chamber; a step of decreasing or stopping the first cooling fan when the sensed temperature of the first storage chamber reaches a value that is below a second reference temperature for the first storage chamber; a step of increasing an output of the first cooling fan when a first reference time elaspes, or the sensed temperature of the first storage chamber reaches a first set temperature (N+a) between the first reference temperature and the second reference temperature after the temperature of the first storage chamber reaches the value that is below the first reference temperature; and a step of decreasing or stopping the output of the first cooling fan when a second reference time elapses, or the sensed temperature of the first storage chamber reaches a previously second set temperature (N+b) between the first set temperature and the first reference temperature after the output of the first cooling fan is changed.

In the state in which the sensed temperature of the first storage chamber reaches the value that is below than the first reference temperature to decrease the output of the first cooling fan, the valve may maintain an opened state of the first refrigerant passage so that the introduction of the refrigerant into the first evaporator is maintained, and after a predetermined time elapses, the valve may close the first refrigerant passage and open the second refrigerant passage to increase the output of the second cooling fan.

The method may further include a step of increasing the output of the second cooling fan when the sensed temperature of the first storage chamber reaches the valve that is below the first reference temperature.

When the sensed temperature of the second storage chamber reaches a third reference temperature for the second storage chamber after the output of the second cooling fan increases, the output of the second cooling fan may decrease or be stopped after the set time elapses in the state in which the output of the compressor decreases or is stopped.

The first set temperature may be greater than a previously set target temperature (N) of the first storage chamber, and the second set temperature may be less than the target temperature (N) of the first storage chamber.

A difference between the first set temperature the target temperature may be less than that between the second set temperature and the target temperature.

The second reference time may be set to increase as the number of times of turn-on operations of the first cooling fan increases.

After the temperature of the first storage chamber reaches the value that is below the first reference temperature, in a state in which the first cooling fan is in rotating, in a state in which the output of the first cooling fan decreases after the output of the first cooling fan increases, or in a state in which the first cooling fan is stopped, the control unit may determine whether a control end condition of the first cooling fan is satisfied, and when the control end condition of the first cooling fan is satisfied, the control unit may end an output control of the first cooling fan.

The case in which the control end condition of the first cooling fan is satisfied may include a case in which the temperature of the first evaporator reaches a control end reference temperature or a case in which the accumulated number of times of the turn-on operation of the first cooling fan or the number of times of output adjustment reaches a reference number.

When the temperature of the second storage chamber reaches the third reference temperature after the output of the second cooling fan increases, the output of each of the compressor and the second cooling fan may decrease, and the output of the first cooling fan may be maintained.

When the second reference time elapses, or the temperature of the first storage chamber reaches the second set temperature after the output of the compressor decreases, the output of the first cooling fan may decrease.

When the temperature of the first storage chamber reaches the first set temperature after the output of the first cooling fan decreases, the output of the first cooling fan may increase again.

A method for controlling a refrigerator according to another aspect includes: a step of switching into a first cooling cycle for cooling a first storage chamber to operate a compressor and a first cold air supply means for the first storage chamber; a step of determining whether a start condition of a second cooling cycle for cooling a second storage chamber is satisfied; a step of turning off the first cold air supply means and turning on the second cold air supply means after the start condition of the second cooling cycle is satisfied; a step of determining whether a start condition of the first cold air supply means is satisfied while the second cooling cycle operates; and a step of turning on the first cold air supply means when the start condition of the first cold air supply means is satisfied.

The method for controlling the refrigerator may further include a step of determining whether a stop condition of the first cold air supply means is satisfied in the state in which the first cold air supply means is turned on; and a step of stopping the first cold air supply means when the stop condition of the first cold air supply means is satisfied.

The first storage chamber may be maintained at a temperature within a range from a first reference temperature to a second reference temperature greater than the first reference temperature.

When the start condition of the first cold air supply means is satisfied, the temperature of the first storage chamber may be equal to or above a first set temperature between the first reference temperature and the second reference temperature.

When the stop condition of the first cold air supply means is satisfied, the temperature of the first storage chamber may be below a second set temperature between the first reference temperature and the second reference temperature.

The first set temperature may be greater than a preset target temperature of the first storage chamber, and the second set temperature may be less than the target temperature of the first storage chamber.

A difference between the first set temperature and the target temperature may be set to be less than that between the second set temperature and the target temperature.

When the stop condition of the first cold air supply means is satisfied, the operation time of the first cold air supply means may reach a reference time.

The reference time may be set to increase as the number of times of a turn-on operation of the first cold air supply unit increases.

In the state in which the first cold air supply means is turned on, or the first cold air supply manes is turned on and then turned off while the second cooling cycle operates, the control unit may determine whether a control end condition of the first cold air supply means is satisfied.

When the control end condition of the first cold air supply means is satisfied, the control unit may end the control of the first cold air supply means.

The case in which the control end condition of the first cold air supply means is satisfied may be a case in which the temperature of an evaporator for the first storage chamber reaches a control end reference temperature or a case in which the accumulated number of times of the first cold air supply means reaches the reference number.

Each of the cold air supply means may be a fan for supplying the cold air to the evaporator.

When the stop condition of the second cooling cycle is satisfied in the state in which the first cold air supply means is turned on while the second cooling cycle operates, the compressor and the second cold air supply means may be turned off, and the first cold air supply means may be maintained in the turn-on state.

When the stop condition of the first cold air supply means is satisfied after the compressor is turned off, the first cold air supply means may be stopped.

When the start condition of the first cold air supply means is satisfied again after the first cold air supply means is turned off, the first cold air supply means may be turned on again.

When the start condition of the second cooling cycle is satisfied, the first cold air supply means may be turned off, and when the first cold air supply means is turned off, and the a set time elapses, the control may allow the refrigerant to flow to the evaporator for the second storage chamber by a switching valve.

A refrigerator according to further another aspect includes: a compressor; a condenser condensing a refrigerant discharged from the compressor; an evaporator for a freezing compartment and an evaporator for a refrigerating compartment, which are branched from an outlet side of the condenser; a switching valve for allowing the refrigerant to flow to one of the evaporator for the freezing compartment and the evaporator for the refrigerating compartment; a freezing compartment fan for blowing air to the evaporator for the freezing compartment; and a refrigerating compartment fan for blowing air to the evaporator for the refrigerating compartment; and a control unit controlling the switching valve and the fans.

While the refrigerating cycle operates, the control unit may allows the refrigerant to flow to the evaporator for the refrigerating compartment by the switching valve and allow the refrigerating compartment fan to rotate, and when the freezing cycle operates, the control unit may allow the refrigerant to flow to the evaporator for the freezing compartment by the switching valve and allow the freezing compartment fan to rotate.

While the freezing cycle operates, the control unit may determine whether a start condition of the refrigerating compartment fan that is in stopped state is satisfied, and when the start condition of the refrigerating compartment fan is satisfied, the refrigerating compartment fan may rotate.

The control unit may determine whether the stop condition of the refrigerating compartment fan is satisfied while the refrigerating compartment fan rotates, and when the stop condition of the refrigerating compartment fan is satisfied, the refrigerating compartment fan may be stopped.

Advantageous Effects

According to the proposed invention, the refrigerating compartment fan may be turned off and then turned off, or the output of the refrigerating compartment fan may decrease and then increase while the freezing cycle operates. Thus, the temperature of the refrigerating compartment may be maintained within a range that is less than that between the first reference temperature and the second reference temperature within the range between the first reference temperature and the second reference temperature.

Thus, the temperature variation width of the refrigerating compartment may be reduced as compared with the case where the refrigerating compartment fan does not operate during the operation of the freezing cycle, and thus the freshness of the object stored in the refrigerating compartment may be improved, and the storage period may increase.

Also, according to the present invention, since the refrigerating compartment fan is rotatable in the state in which the refrigerating cycle is stopped, the time take to allow the temperature of the refrigerating compartment to reach the first refrigerating compartment reference temperature or the first freezing compartment reference temperature may be delayed. Thus, the possibility that the start condition of the refrigerating cycle is satisfied before the stop condition of the refrigerating cycle is satisfied may be reduced to reduce the power consumption of the compressor.

Also, the possibility that the start condition of the refrigerating cycle is satisfied before the stop condition of the refrigerating cycle is satisfied may be reduced so that the compressor is normally turned off after the refrigerating cycle is stopped. Therefore, the turn-off time of the compressor may be secured to reduce the power consumption of the compressor.

MODE FOR CARRYING OUT THE INVENTION

Figure 1:
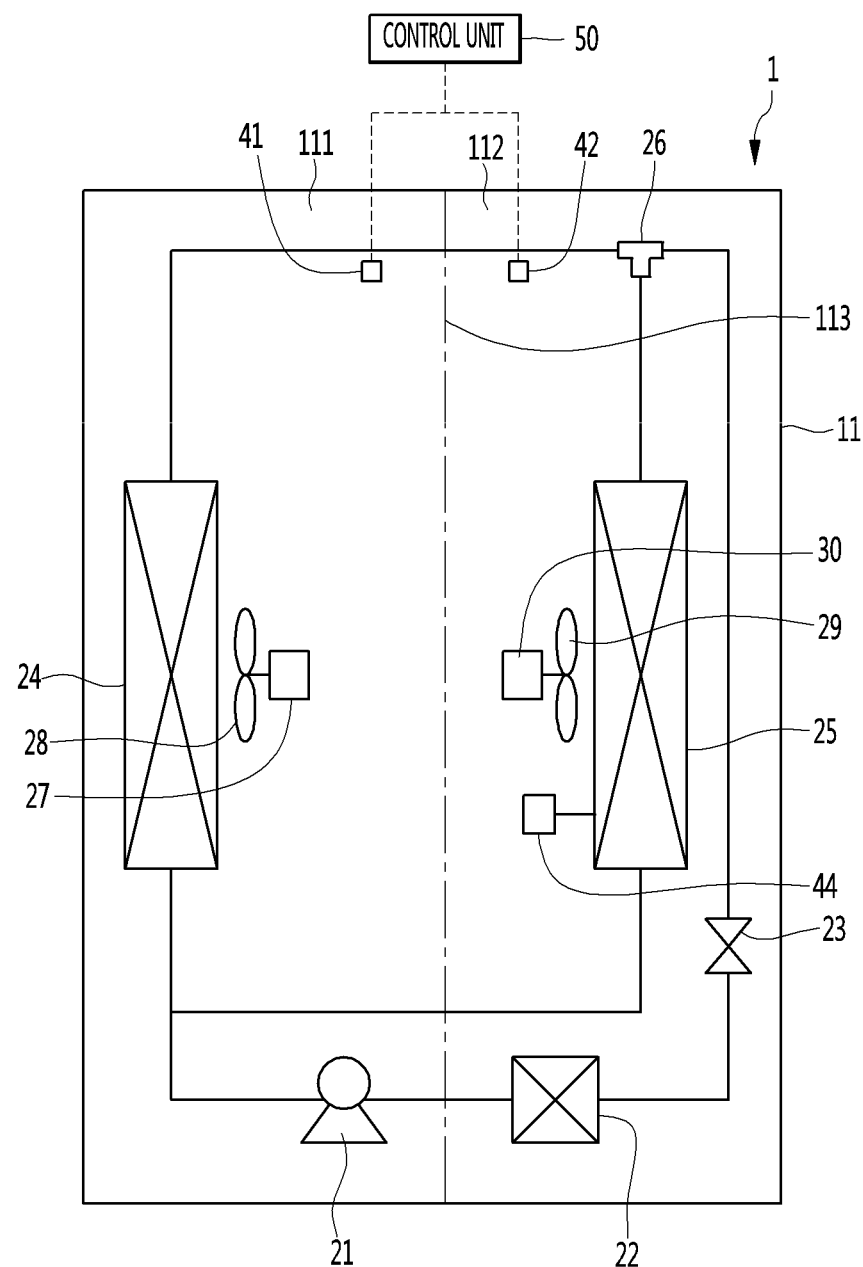
FIG. 1 is a schematic view illustrating a configuration of a refrigerator according to a first embodiment of the present invention.

Hereinafter, embodiments of the present invention will be described in detail with reference to the accompanying drawings. It is noted that the same or similar components in the drawings are designated by the same reference numerals as far as possible even if they are shown in different drawings. In the following description of the present invention, a detailed description of known functions and configurations incorporated herein will be omitted to avoid making the subject matter of the present invention unclear.

In the description of the elements of the present invention, the terms first, second, A, B, (a), and (b) may be used. However, since the terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to", "engaged with", or "connected to" the other element between them.

Figure 2:
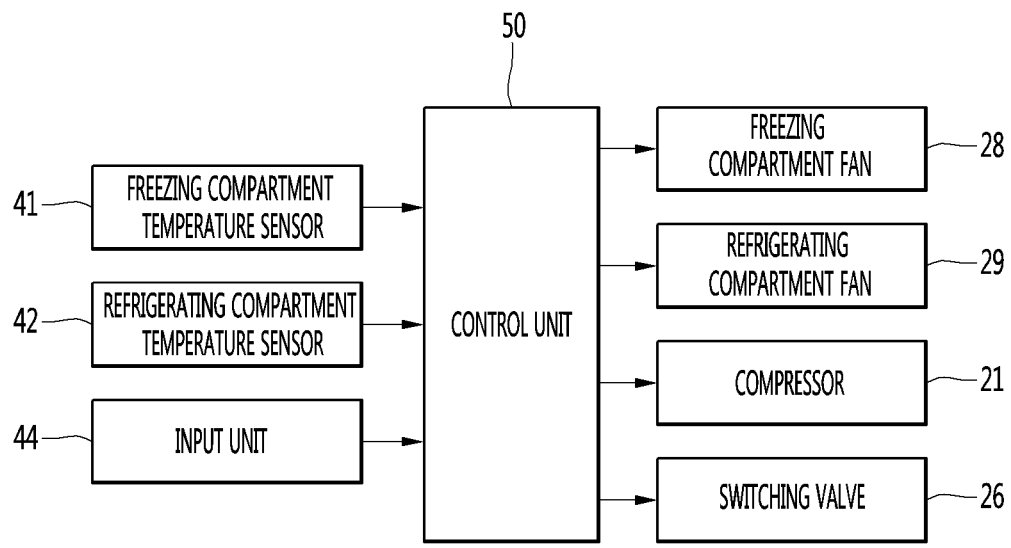
FIG. 2 is a block diagram of the refrigerator according to the first embodiment.

FIG. 1 is a schematic view illustrating a configuration of a refrigerator according to a first embodiment of the present invention, and FIG. 2 is a block diagram of the refrigerator according to the first embodiment.

Referring to FIGS. 1 and 2, a refrigerator 1 according to a first embodiment of the present invention may include a cabinet having a freezing compartment 111 and a refrigerating compartment 112 therein and a door (not shown) coupled to the cabinet 10 to open and close each of the freezing compartment 111 and the refrigerating compartment 112.

The freezing compartment 111 and the refrigerating compartment 112 may be horizontally or vertically partitioned within the cabinet 10 by a partition wall 113.

The refrigerator 1 may further include a compressor 21 compressing a refrigerant, an evaporator 24 for a freezing compartment (or referred to as a "second evaporator"), which receives the refrigerant from the compressor 21 to generate cold air for cooling the freezing compartment 111, and an evaporator 25 for a refrigerating compartment (or referred to as a "first evaporator"), which receives the refrigerant from the compressor 21 to generate cold air for cooling the refrigerating compartment 112.

The refrigerator 1 may include a switching valve 26 for allowing the refrigerant passing through an expansion member 23 to flow to one of the evaporator 24 for the freezing compartment or the evaporator for the refrigerating compartment.

In the present invention, the state in which the switching valve 26 operates so that the refrigerant flows to the evaporator 24 for the freezing compartment may be referred to as a first state of the switching valve 26. Also, the state in which the switching valve 26 operates so that the refrigerant flows to the evaporator 25 for the refrigerating compartment may be referred to as a second state of the switching valve 26. The switching valve 26 may be, for example, a three way valve.

The refrigerator 1 may include a freezing compartment fan (referred to as a "second cooling fan") for blowing air to the evaporator 24 for the freezing compartment, a freezing compartment fan motor 27 for rotating the freezing compartment fan 28, a refrigerating compartment fan 29 (referred to as a "first cooling fan") for blowing air to the evaporator 25 for the refrigerating compartment, and a refrigerating compartment fan motor 30 for rotating the refrigerating compartment fan 29.

In the present invention, a series of cycles in which the refrigerant flows to a compressor 21, a condenser 22, an expansion member 23, and the evaporator 24 for the freezing compartment is referred to as a "freezing cycle", and a series of cycles in which the refrigerant flows to the compressor 21, the condenser 22, the expansion member 23, and the evaporator 25 for the refrigerating compartment is referred to as a "refrigerating cycle".

The switching valve 26 may selectively open one of a first refrigerant passage connected between the compressor 21 and the evaporator 25 for the refrigerating compartment to allow the refrigerant to flow therebetween and a second refrigerant passage connected between the compressor 21 and the evaporator 24 for the freezing compartment to allow the refrigerant to flow therebetween. The cooling of the refrigerating compartment 112 and the cooling of the freezing compartment 111 may be alternately performed by the switching valve 26.

Also, the freezing compartment fan 28 may rotate during the freezing cycle operation, and the refrigerating compartment fan 29 may rotate during the refrigerating cycle operation. Here, the compressor 21 continuously operates during the operation of each of the freezing cycle and the refrigerating cycle.

Although one expansion member 23 is disposed at an upstream side of the switching valve 26 as described above, a first expansion member may be disposed between the switching valve 26 and the evaporator 24 for the freezing compartment, and a second expansion member may be disposed between the switching valve 26 and the evaporator 25 for the refrigerating compartment.

For another example, a first valve may be disposed at an inlet side of the evaporator 24 for the freezing compartment, and a second valve may be disposed at an inlet side of the evaporator 25 for the refrigerating compartment without using the switching valve 26. Also, while the freezing cycle operates, the first valve may be turned on, and the second valve may be turned off. When the refrigerating cycle operates, the first valve may be turned off, and the second valve may be turned on.

Also, the refrigerator 1 may further include a freezing compartment temperature sensor 41 for sensing a temperature of the freezing compartment 111, a refrigerating compartment temperature sensor 42 for sensing a temperature of the refrigerating compartment 112, an input unit 43 for inputting a target temperature (or a desired temperature) of each of the freezing compartment 111 and the refrigerating compartment 112, and a control unit 50 controlling the cooling cycle (including the freezing cycle and the refrigerating cycle) on the basis of the inputted target temperature and the temperatures sensed by the temperature sensors 41 and 42.

In this specification, a temperature less than that target temperature of the freezing compartment 111 may be called a first freezing compartment reference temperature (or a third reference temperature), and a temperature greater than the target temperature of the freezing compartment 111 may be called a second freezing compartment reference temperature (or a fourth reference temperature). Also, a range between the first freezing compartment reference temperature and the second freezing compartment reference temperature may be called a freezing compartment set temperature range.

Although not limited, the target temperature of the freezing compartment 111 may be a mean temperature of the first freezing compartment reference temperature and the second freezing compartment reference temperature.

Also, in this specification, a temperature less than that target temperature of the refrigerating compartment 112 may be called a first refrigerating compartment reference temperature (or a first reference temperature), and a temperature greater than the target temperature of the refrigerating compartment 112 may be called a second refrigerating compartment reference temperature (or a second reference temperature). Also, a range between the first refrigerating compartment reference temperature and the second refrigerating compartment reference temperature may be called a freezing compartment set temperature range.

Although not limited, the target temperature of the refrigerating compartment 112 may be a mean temperature of the first refrigerating compartment reference temperature and the second refrigerating compartment reference temperature.

In the present invention, a user may set a target temperature of each of the freezing compartment 111 and the refrigerating compartment 112.

The control unit 50 may control the temperature of the refrigerating compartment 112 to be maintained within the set temperature range.

The refrigerator 1 may further include an evaporator temperature sensor 44 sensing a temperature of the evaporator 25 for the refrigerating compartment.

For example, the evaporator temperature sensor 44 may sense the temperature of the evaporator 25 for the refrigerating compartment while a defrosting process of the evaporator 25 for the refrigerating compartment. The control unit 50 may determine whether the defrosting process is completed based on the temperature sensed by the evaporator temperature sensor 44.

For example, the temperature at which the defrosting completion is determined may be called a defrost reference temperature, and the defrost reference temperature may be set at a temperature below zero. The defrost reference temperature may be set at, for example, 2 degrees below zero.

In the present invention, if the refrigerating cycle is stopped after the refrigerating cycle operates, the freezing cycle may operate. Also, when the freezing cycle is stopped, the compressor 21 may be stopped for a predetermined time or while satisfying a specific condition.

The control unit 50 operates the refrigerating cycle when the sensed temperature of the refrigerating compartment 112 is equal to or greater than the reference temperature of the second refrigerating compartment (satisfying a refrigerating cycle start condition), and the refrigerating cycle may be stopped when the sensed temperature of the refrigerating compartment 112 is equal to or below the first refrigerating compartment reference temperature (satisfying a refrigerating cycle start condition or a refrigerating cycle stop condition).

When the sensed temperature of the freezing compartment 111 is less than the first freezing compartment reference temperature in the state in which the temperature of the refrigerating compartment 112 is greater than the first refrigerating compartment reference temperature while the freezing cycle operates, the freezing cycle may be stopped (the freezing cycle stop condition is satisfied). In the present invention, the satisfaction of the start condition of the refrigerating cycle may take precedence over the satisfaction of the stop condition of the freezing cycle.

That is, when the start condition of the refrigerating cycle is satisfied before the stop condition of the freezing cycle is satisfied during the operation of the freezing cycle, the freezing cycle is stopped, and the freezing cycle may start.

Hereinafter, a method of controlling the refrigerator of the present invention will be described.

Figure 3:
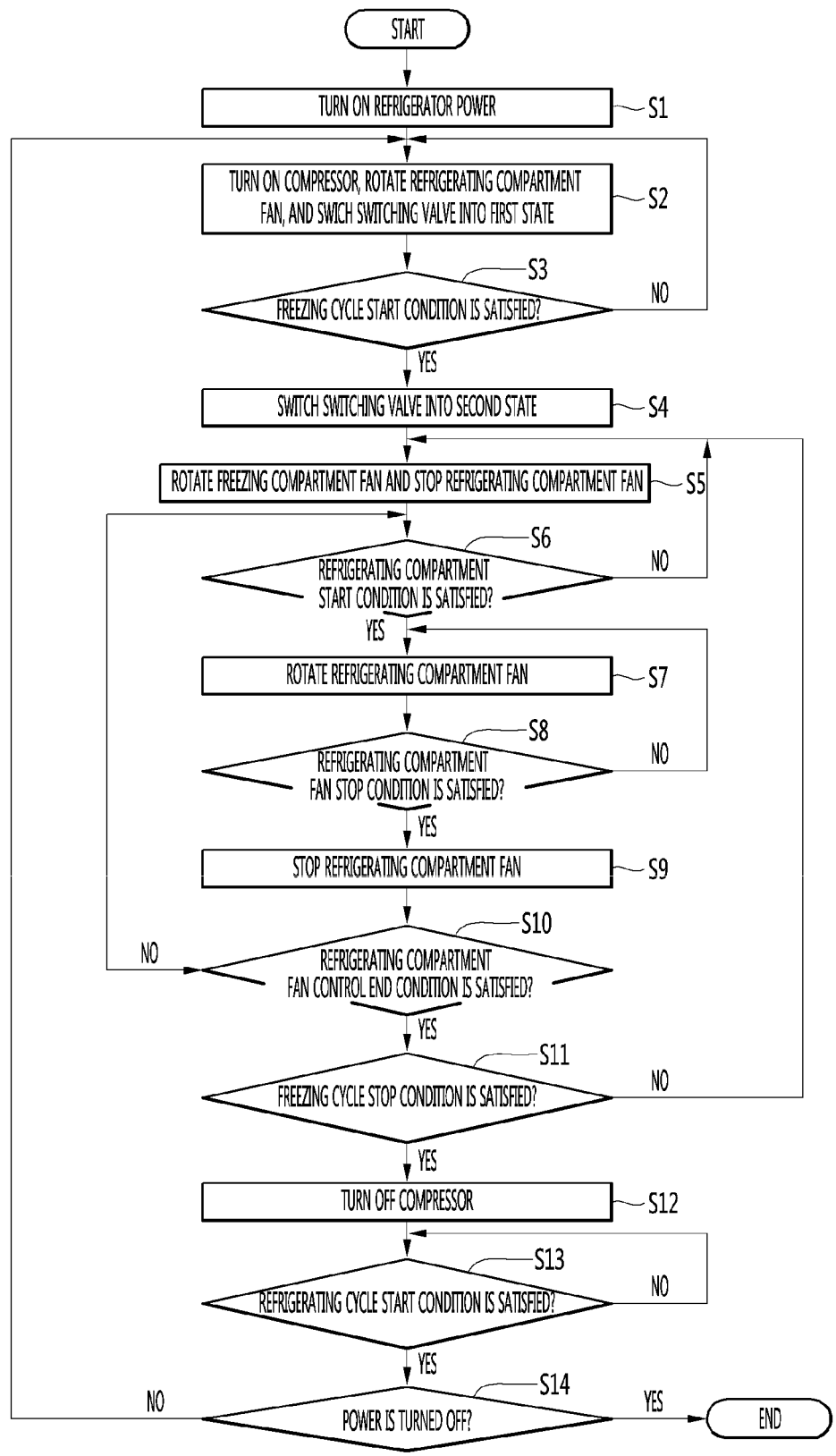
FIG. 3 is a flowchart illustrating a method for controlling a refrigerator according to an embodiment of the present invention.
Figure 4:
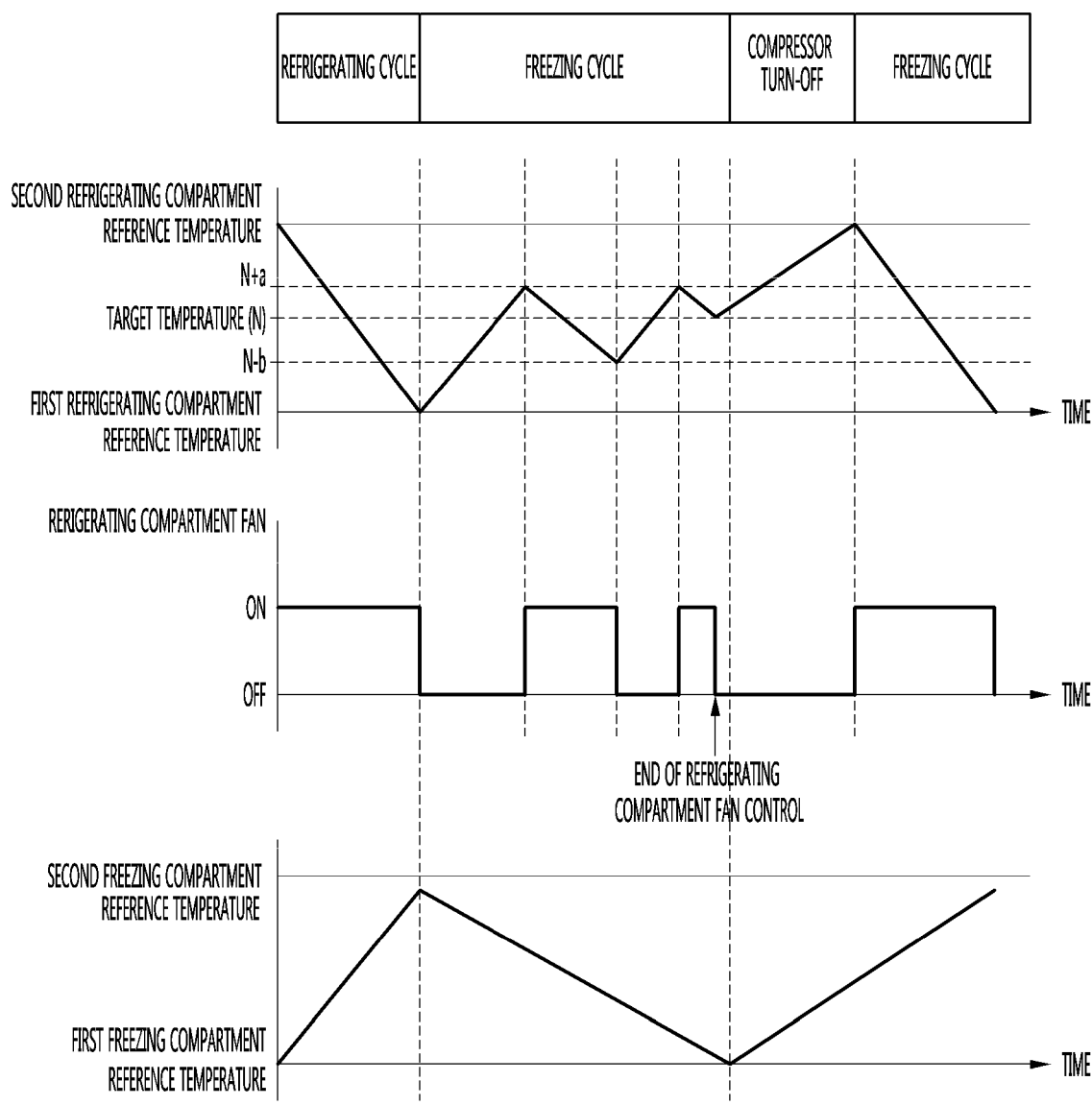
FIG. 4 is a view illustrating a variation in temperature of the storage chamber and an operation of a refrigerating compartment fan according to the control method of the refrigerator of the present invention.

FIG. 3 is a flowchart illustrating a method for controlling the refrigerator according to an embodiment of the present invention, and FIG. 4 is a view illustrating a variation in temperature of the storage chamber and an operation of the refrigerating compartment fan according to the control method of the refrigerator of the present invention.

Referring to FIGS. 1 to 4, power of the refrigerator 1 is turned on (S1). When the power of the refrigerator 1 is turned on, the refrigerator 1 for cooling the freezing compartment 111 or the refrigerating compartment 112 operates.

Hereinafter, a method of controlling the refrigerator when the freezing compartment 111 is cooled after the refrigerating compartment 112 is cooled will be described.

To cool the refrigerating compartment 112, the control unit 50 may turn on the compressor 21 and rotate the refrigerating compartment fan 29 (S2). Also, the switching valve 26 may be switched into the first state so that the refrigerant flows to the evaporator 25 for the refrigerating compartment (S2).

The control unit 50 may rotate the refrigerating compartment fan 29 when the temperature of the refrigerating compartment 112 reaches the second refrigerating compartment reference temperature or more after the refrigerator 1 is turned on. In view of an output, when the refrigerating compartment fan 29 rotates in a stopped state, it may be explained that an output of the refrigerating compartment fan 29 increases.

Also, when the refrigerating cycle operates, the freezing compartment fan 28 may be maintained in the stopped state.

Thus, the refrigerant passing through the condenser 22 after compressed in the compressor 21 flows the evaporator 25 or refrigerating compartment through the switching valve 26. Also, the refrigerating evaporated while flowing through the evaporator 25 for the refrigerating compartment is introduced again into the compressor 21.

Also, air heat-exchanged with the evaporator 25 for the refrigerating compartment is supplied to the refrigerating compartment 112. Thus, the temperature of the refrigerating compartment 112 may decrease, but the temperature of the freezing compartment 111 may increase.

While the refrigerating cycle operates, the control unit 50 determines whether the start condition of the freezing cycle is satisfied (S3). That is, the control unit 50 determines whether the stop condition of the refrigerating cycle is satisfied.

As the determination result in the operation S3, when it is determined that the start condition of the freezing cycle is satisfied, the control unit 50 operates the freezing cycle.

For example, the control unit 50 switches the switch valve 26 into the second state so that the refrigerant flows to the evaporator 24 for the freezing compartment (S4). Although the freezing cycle is switched in the refrigerating cycle, the compressor 21 continuously operates without being stopped.

Also, the control unit 50 rotates the freezing compartment fan 28 and stops the refrigerating compartment fan 29 (S5).

For another example, when it is determined that the start condition of the freezing cycle is satisfied, the control unit 50 stops the refrigerating compartment fan 29 to reduce an output of the refrigerating compartment fan 29. For example, the control unit 50 may rotate the refrigerating compartment fan 29 at a minimum rotation rate.

When the refrigerating compartment fan 29 rotates at the minimum rotation rate, the temperature of the refrigerating compartment 112 may increase, but the increase of the temperature may be delayed.

After the freezing cycle starts, the control unit 50 determines whether the start condition of the refrigerating compartment fan 29 is satisfied (S6).

For example, the control unit 50 may determine that the start condition of the refrigerating compartment fan 29 is satisfied when the temperature of the refrigerating compartment 112 is greater than a first set temperature (N+a).

The first set temperature (N+a) may be set to, for example, a temperature greater than the preset target temperature N and less than the second refrigerating compartment reference temperature.

For another example, when the freezing cycle starts, and the first reference time elapses, it is determined that the start condition of the refrigerating compartment fan 29 is satisfied.

As the determination result in the operation S6, when it is determined that the start condition of the refrigerating compartment fan 29 is satisfied, the control unit 50 rotates the refrigerating compartment fan 29 (S7).

That is, in this embodiment, while the freezing cycle operates, the refrigerating compartment fan 29 may be turned on. Thus, a predetermined section in which the freezing cycle operates, the refrigerating compartment fan 29 and the freezing compartment fan 28 operate together with each other.

For another example, the operation S6 may be changed into a step for determining whether an output increase condition of the refrigerating compartment fan 29 is satisfied. In this case, as the freezing cycle starts, when the temperature of the refrigerating compartment 112 is greater than the first set temperature (N+a) in the state in which the output of the refrigerating compartment fan 29 decreases, the control unit 50 may increase the output of the refrigerating compartment fan 29. That is, a rotation rate of the refrigerating compartment fan 29 may increase.

When the refrigerating compartment fan 29 rotates, air may be cooled by latent heat of evaporation remaining in the evaporator 25 for the refrigerating compartment, and the cooled air may be supplied to the refrigerating compartment 112 to reduce the temperature of the refrigerating compartment 112, That is, when the refrigerating compartment fan 29 rotates, the increase in temperature of the refrigerating compartment 112 may be delayed.

While the refrigerating compartment fan 29 rotates, the control unit 50 may determine whether the stop condition of the refrigerating compartment fan 29 is satisfied (S8).

For example, the control unit 50 may determine that the stop condition of the refrigerating compartment fan 29 is satisfied when the temperature of the refrigerating compartment 112 is greater than a second set temperature (N-b).

As the determination result in the operation S8, when it is determined that the stop condition of the refrigerating compartment fan 29 is satisfied, the control unit 50 stops the refrigerating compartment fan 29 (S9).

The second set temperature (N-b) may be set to, for example, a temperature less than the preset target temperature N and greater than the first refrigerating compartment reference temperature.

Thus, the temperature range between the first set temperature and the second set temperature is less than the refrigerating compartment set temperature range.

When the refrigerating compartment fan 29 is turned on and then turned off, or the output (the rotation rate) of the refrigerating compartment fan 29 varies during the operation of the freezing cycle like the present invention, the temperature of the refrigerating compartment 112 may vary within the first set temperature and the second set temperature range. Thus, the temperature variation width of the refrigerating compartment 112 may be reduced compared with the case where the refrigerating compartment fan 29 does not rotate.

In the present invention, a value a may be less than a value b. When the value a is close to the reference temperature of the second refrigerating compartment, the refrigerating cycle may start after the compressor 21 is not turned off after the refrigerating cycle normally operates.

On the other hand, since the value b is maintained in the stopped state even if the value b is close to the reference temperature of the first refrigerating compartment, the cycle may not be changed, and the temperature of the refrigerating compartment 112 may be maintained at a low temperature.

Then, the control unit 50 may determine whether the control end condition of the refrigerating compartment fan 20 is satisfied (S10).

The control end condition of the refrigerating compartment fan 29 may be determined to be satisfied, for example, when the temperature sensed by the evaporator temperature sensor 44 reaches the control end reference temperature. For example, the control end reference temperature may be the same as the defrost reference temperature. For another example, the control end condition of the refrigerating compartment fan 29 may be determined to be satisfied when the third reference time elapses from the start of the freezing cycle.

When the refrigerating compartment fan 29 rotates in the state in which the refrigerating cycle is stopped, the air of the refrigerating compartment 112 may be heat-exchanged with the evaporator 25 for the refrigerating compartment, and the temperature of the evaporator 25 for the refrigerating compartment may increase.

Here, when the temperature of the refrigerating compartment evaporator 25 increases and thus is equal to or greater than the defrost reference temperature, frost formed on a surface of the refrigerating compartment evaporator 25 is melted. If the frost is melted, there is a tendency for the frost to become entangled, which leads to a phenomenon in which the defrosting process is not completed later.

Thus, in the present invention, during the operation of the freezing cycle, the refrigerating compartment fan 29 is intermittently turned on, or the output of the refrigerating compartment fan 29 varies. When the temperature sensed by the evaporator temperature sensor 44 reaches the control end reference temperature, the control unit 50 ends the control of the refrigerating compartment fan 29.

Here, although the operation 10 is described as being performed after the operation S9, it may alternatively be performed between the operation S7 and the operation S8.

For example, when the temperature detected by the evaporator temperature sensor 44 reaches the control end reference temperature while the temperature of the refrigerating compartment 112 does not reach the second set temperature while the refrigerating compartment fan 29 rotates, the control unit 50 may stop the refrigerating compartment fan 29 to end the control of the refrigerating compartment fan 29.

In the present invention, the control end of the refrigerating compartment fan 29 represents that the refrigerating compartment fan 29 does not rotate any longer during the operation of the freezing cycle.

As the determination result in the operation S10, when it is determined that the control end condition of the refrigerating compartment fan 29 is satisfied, the control unit 50 may determine whether the stop condition of the freezing cycle is satisfied (S11). That is, the control unit 50 may determine whether the temperature of the freezing compartment 111 is less than the first freezing compartment reference temperature.

As the determination result in the operation S11, when the stop condition of the freezing cycle is satisfied, the control unit 50 turns off the compressor 21 to prevent the compressor 21 from being damaged (S12). On the other hand, if the stop condition of the freezing cycle is not satisfied, the process returns to the operation S5. In the state in which the compressor 21 is turned off, the control unit 50 may not stop the freezing compartment fan 28 immediately, but stop the freezing compartment fan 28 after a predetermined time elapses or may reduce the output of the freezing compartment fan 28.

In the state in which the compressor 21 is turned off, the control unit 50 may determine whether the start condition of the refrigerating cycle is satisfied (S13).

As the determination result in the operation S13, when it is determined that the start condition of the refrigerating cycle is satisfied, the refrigerating cycle starts (returns to the operation S2) if the power is not turned of (S14).

If the stop condition of the freezing cycle is satisfied in the process of rotating the refrigerating compartment fan 29 while the freezing cycle operates, the freezing cycle is stopped, and the compressor 21 is turned off. Here, in the present invention, the rotating refrigerating compartment fan 29 may continuously rotates even when the compressor 21 is turned off.

Also, the refrigerating compartment fan 29 may be turned off when the temperature of the refrigerating compartment 112 reaches a turn-off reference temperature. Also, the refrigerating compartment fan 29 may be turned on again when the temperature of the refrigerating compartment 112 is equal to or greater than a turn-on reference temperature unless the compressor 21 is in the off state, and the control end condition of the refrigerating compartment fan 29 is not satisfied.

Alternatively, when the refrigerating compartment fan 29 is stopped once in the state in which the compressor 21 is turned off, the control of the refrigerating compartment fan 29 may be ended even though the control end condition of the refrigerating compartment fan 29 is not satisfied.

Also, when the start condition of the refrigerating cycle is satisfied in the state in which the stop condition of the freezing cycle is not satisfied while the freezing cycle operates, the compressor 21 may not be turned off, but the freezing cycle may start immediately. In this case, since the compressor 21 continuously operates, the power consumption increases.

However, according to the present invention, since the refrigerating compartment fan 29 is rotatable in the state in which the refrigerating cycle is stopped, the time take to allow the temperature of the refrigerating compartment to reach the second refrigerating compartment reference temperature or the first freezing compartment reference temperature may be delayed. Thus, the possibility that the start condition of the refrigerating cycle is satisfied before the stop condition of the refrigerating cycle is satisfied may be reduced to reduce the power consumption of the compressor 21.

Also, the possibility that the start condition of the refrigerating cycle is satisfied before the stop condition of the refrigerating cycle is satisfied may be reduced so that the compressor 21 is normally turned off after the refrigerating cycle is stopped. Therefore, the turn-off time of the compressor may be secured to reduce the power consumption of the compressor 21.

In the abovementioned embodiment, when the temperature of the refrigerating compartment 112 is less than the second set temperature (N-b), it is determined that the stop condition (or an output decrease condition) of the refrigerating compartment fan 29 is satisfied. On the other hand, whether the stop condition (or the output decrease condition) of the refrigerating compartment fan 29 is satisfied may be determined based on an operation time of the refrigerating compartment fan 29.

For example, when the operation time of the refrigerating compartment fan 29 reaches a second reference time after the start of the rotation of the refrigerating compartment fan 29 (or after the increase of the output) because the start condition (or an output increase condition) of the refrigerating compartment fan 29 is satisfied, the refrigerating compartment fan 29 may be stopped (or the output may be reduced).

Here, the second reference time may be set to be constant regardless of the number of times of the turn-on operation (or the number of times of output increase) of the refrigerating compartment fan 29, or as the number of times of the turn-on operation (or the number of times of the output increase) increases, the second reference time may increases.

For example, the reference time for determining the stop time point when the refrigerating compartment fan 29 is turned on for the second time may be set to be longer than the reference time for determining the stop time point when the refrigerating compartment fan 29 is turned on once.

This is done because the time taken to decrease the temperature of the refrigerating compartment 112 is required more due to the decrease of the latent heat of evaporation of the refrigerating compartment evaporator 25 as the time during which the refrigerating cycle is turned off increases.

In the above embodiment, when the temperature detected by the evaporator temperature sensor reaches the control end reference temperature, it is determined that the control end condition of the refrigerating compartment fan is satisfied. However, it is possible to determine whether the control end condition is satisfied.

For example, when the accumulated number of times of the turn-on operation of the refrigerating compartment fan 29 is two times, the control unit 50 may determine that the control end condition of the refrigerating compartment fan 29 is satisfied when the refrigerating compartment fan 29 is turned on for a second time and then turned off.

Figure 5:
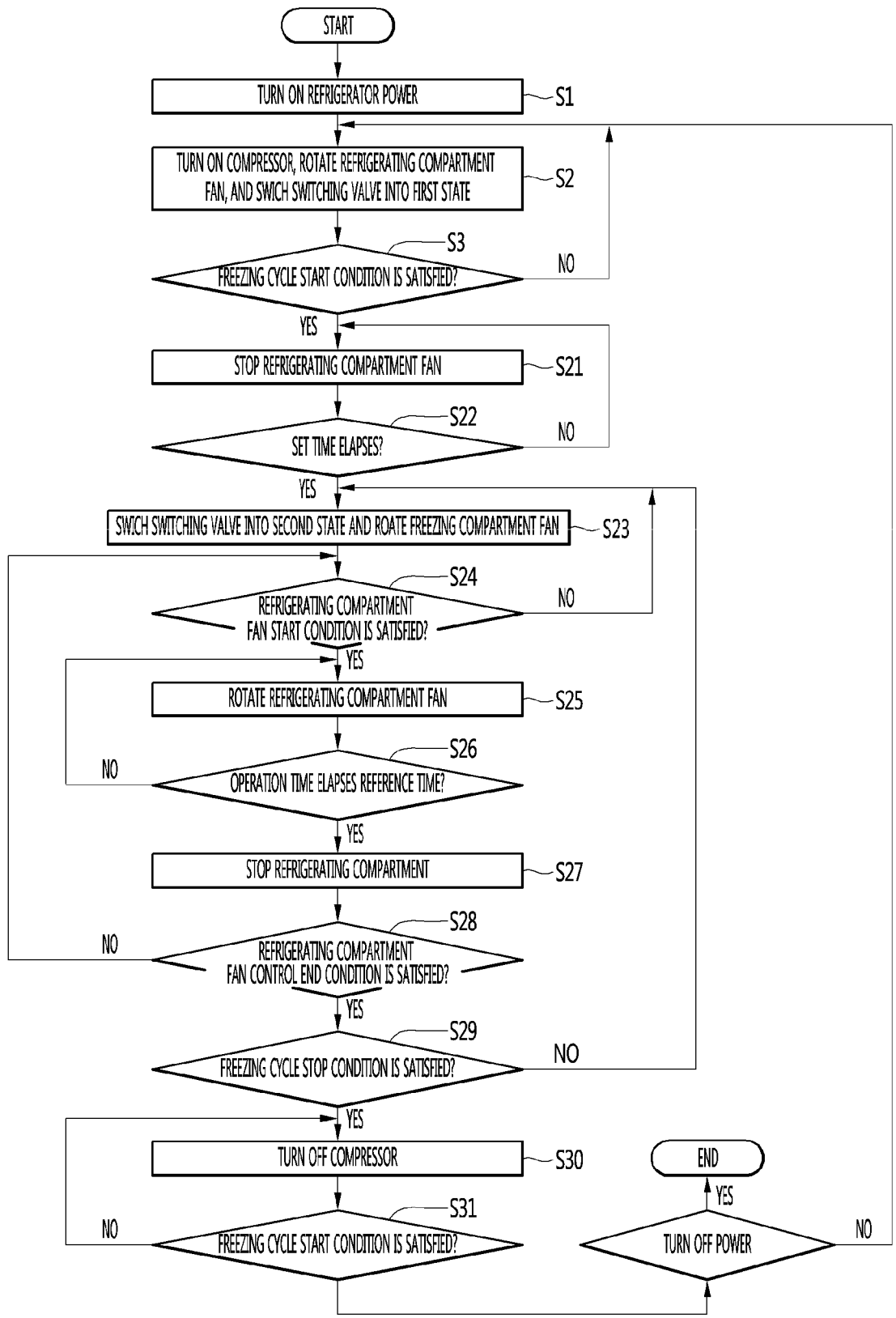
FIG. 5 is a flowchart illustrating a method for controlling a refrigerator according to a second embodiment of the present invention.

FIG. 5 is a flowchart illustrating a method for controlling a refrigerator according to a second embodiment of the present invention.

The present embodiment is the same as the first embodiment except for a change in state of a switching valve and a difference in criterion for determining whether a stop condition of a refrigerating compartment fan is satisfied. Thus, only characterized parts in this embodiment will be described below.

Referring to FIG. 5, power of a refrigerator 1 is turned on (S1). When the power of the refrigerator 1 is turned on, the refrigerator 1 for cooling a refrigerating compartment 111 or a freezing compartment 112 operates.

Hereinafter, a method of controlling the refrigerator when the freezing compartment 111 is cooled after the refrigerating compartment 112 is cooled will be described.

To cool the refrigerating compartment 112, a control unit may turn on a compressor 21 and rotate a refrigerating compartment fan 29 (S2). Also, a switching valve 26 may be switched into a first state so that the refrigerant flows to an evaporator 25 for the refrigerating compartment (S2). Also, when a refrigerating cycle operates, a freezing compartment fan 28 may be maintained in a stopped state.

While the refrigerating cycle operates, the control unit 50 determines whether a start condition of a freezing cycle is satisfied (S3). That is, the control unit 50 determines whether a stop condition of the refrigerating cycle is satisfied.

For example, the control unit 50 may determine that the start condition of the refrigerating compartment fan 29 is satisfied when the temperature of the refrigerating compartment 112 is less than a first refrigerating compartment reference temperature.

As the determination result in the operation S3, when it is determined that the start condition of the freezing cycle is satisfied, the control unit 50 stops the freezing cycle (S21).

For another example, when it is determined that the start condition of the freezing cycle is satisfied, the control unit 50 reduce an output of the refrigerating compartment fan 29. For example, the control unit 50 may rotate the refrigerating compartment fan 29 at a minimum rotation rate.

Then, the control unit 50 may determine whether a set time elapses from a time point at which it is determined that the start condition of the freezing cycle is satisfied (S22).

As the determination result in the operation S22, when it is determined that the set time elapses from the time point at which it is determined that the start condition of the freezing cycle is satisfied, the control unit 50 switches the switch valve into a second state so that a refrigerant flows to the evaporator 24 for the freezing compartment (S23). Also, the control unit 50 rotates the freezing compartment fan 28 (S23).

In this embodiment, even if the freezing cycle start condition is satisfied, the switching valve 26 does not immediately perform the switching operation, but performs the switching operation after the set time elapses. Thus, in the state in which the refrigerating compartment fan 29 is stopped (or the output is reduced), the refrigerant may flow to the evaporator 25 for the refrigerating compartment.

Since air does not flow to the refrigerating compartment evaporator 25 (or a small amount of air flows) when the refrigerating compartment fan 29 is stopped (or the output is reduced), the temperature of the refrigerating compartment 112 does not decrease, but the latent heat of evaporation of the refrigerating chamber evaporator 25 may increase.

After the freezing cycle starts, the control unit 50 determines whether the start condition of the refrigerating compartment fan 29 is satisfied (S24).

For example, the control unit 50 may determine that the start condition of the refrigerating compartment fan 29 is satisfied when the temperature of the refrigerating compartment 112 is greater than a first set temperature (N+a).

For another example, the operation S24 may be changed into a step for determining whether an output increase condition of the refrigerating compartment fan 29 is satisfied. In this case, when the temperature of the refrigerating compartment 112 is greater than the first set temperature (N+a) in the state in which the output of the refrigerating compartment fan 29 decreases, the control unit 50 may increase the output of the refrigerating compartment fan 29. That is, a rotation rate of the refrigerating compartment fan 29 may increase.

As the determination result in the operation S24, when it is determined that the start condition of the refrigerating compartment fan 29 is satisfied, the control unit 50 rotates the refrigerating compartment fan 29 (S25).

When the refrigerating compartment fan 29 rotates, air may be cooled by latent heat of evaporation remaining in the evaporator 25 for the refrigerating compartment, and the temperature of the refrigerating compartment 112 may decrease. That is, when the refrigerating compartment fan 29 rotates, the increase in temperature of the refrigerating compartment 112 may be delayed.

While the refrigerating compartment fan 29 rotates, the control unit 50 may determine whether the stop condition of the refrigerating compartment fan 29 is satisfied.

In this embodiment, for example, the control unit 50 may determine whether an operation time of the refrigerating compartment fan 29 exceeds a second reference time (S26).

As the determination result in the operation S26, when it is determined that the stop condition of the refrigerating compartment fan 29 is satisfied, the control unit 50 stops the refrigerating compartment fan 29 (S27).

For another example, when the operation time of the refrigerating compartment fan 29 exceeds the second reference time, the control unit 50 may determine that the output decrease condition of the refrigerating compartment fan 29 is satisfied. Also, when it is determined that the output decrease condition is satisfied, the control unit 50 reduce an output of the refrigerating compartment fan 29.

For another example, the determination method in the operation S26 may use the determination method in the operation S8 according to the first embodiment. That is, when the temperature of the refrigerating compartment reaches a turn-off reference temperature, it is determined that the stop condition (or the output decrease condition) of the refrigerating compartment fan 29 is satisfied.

Then, the control unit 50 may determine whether the control end condition of the refrigerating compartment fan 20 is satisfied (S28). The method of determining whether or not the control end condition is satisfied in the this embodiment is the same as the determination method in the operation S10 of the first embodiment, and thus a detailed description thereof will be omitted.

As the determination result in the operation S28, when it is determined that the control end condition of the refrigerating compartment fan 29 is satisfied, the control unit 50 may determine whether the stop condition of the freezing cycle is satisfied (S29).

As the determination result in the operation S29, when the stop condition of the freezing cycle is satisfied, the control unit 50 turns off the compressor 21 to prevent the compressor 21 from being damaged (S30). On the other hand, if the stop condition of the freezing cycle is not satisfied, the process returns to the operation S23.

In the state in which the compressor 21 is turned off, the control unit 50 may determine whether the start condition of the refrigerating cycle is satisfied (S31).

As the determination result in the operation S31, when it is determined that the start condition of the refrigerating cycle is satisfied, the refrigerating cycle starts (returns to the operation S2) if the power is not turned of (S32).

In this embodiment, the operations S28 to S32 are the same as the operations S10 to S14 according to the first embodiment.

In this specification, the refrigerating compartment may be referred to as a first storage chamber, and the freezing compartment may be referred to as a second storage chamber. Also, the refrigerating cycle may be referred to as a first cooling cycle for the first storage chamber, and the freezing cycle may be referred to as a second cooling cycle for the second storage chamber. Also, the refrigerating compartment fan may be referred to as a first cold air supply means for the first storage chamber, and the freezing compartment fan may be referred to as a second cold air supply means for the second storage chamber.

In the above embodiment, the refrigerator has been described in which two compressors and two evaporators are used to constitute two cooling cycles. However, on the other hand, in the control method for reducing the temperature variation of the storage chamber of the present invention, it should be noted that the present invention can also be applied to refrigerators constituting two cooling cycles using two evaporators. In this case, the cold air supply means may include the fan (the refrigerating compartment fan and the freezing compartment fan) for blowing air to the compressor (a compressor for the freezing compartment and the compressor for the refrigerating compartment) and an evaporator (the evaporator for the freezing compartment and the evaporator for the refrigerating compartment).

Figure 6:
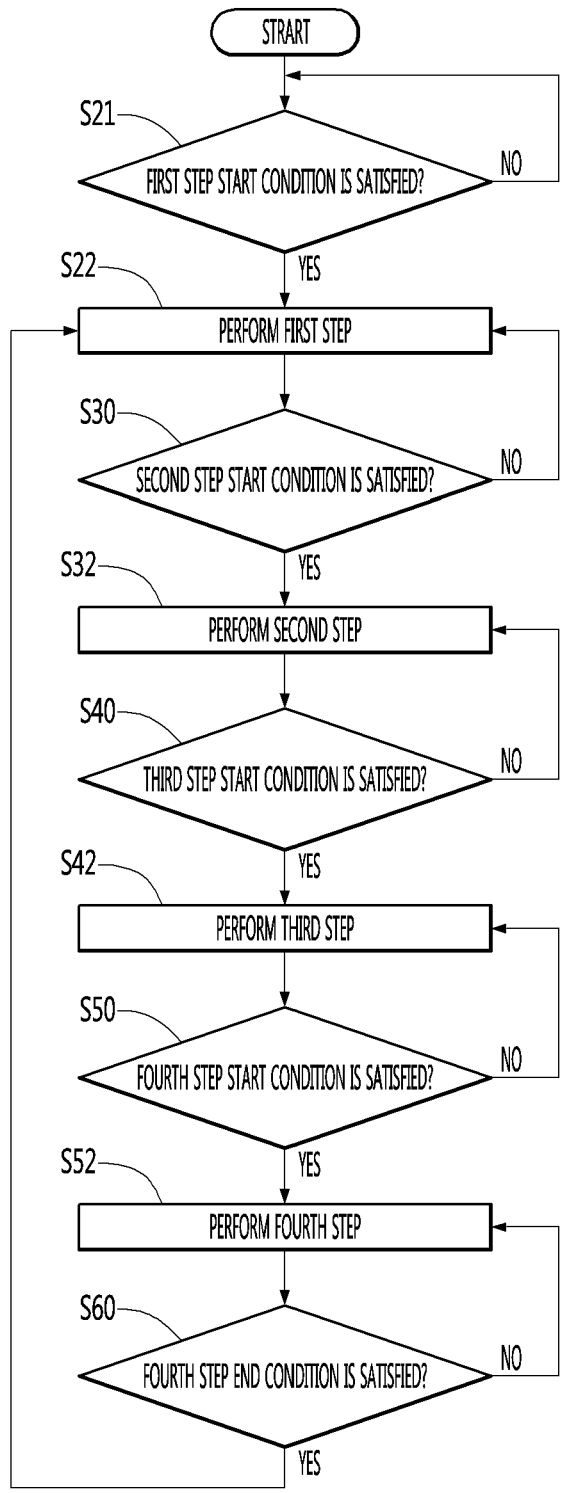
FIG. 6 is a flowchart illustrating a method for controlling a refrigerator according to a third embodiment of the present invention.
Figure 7:
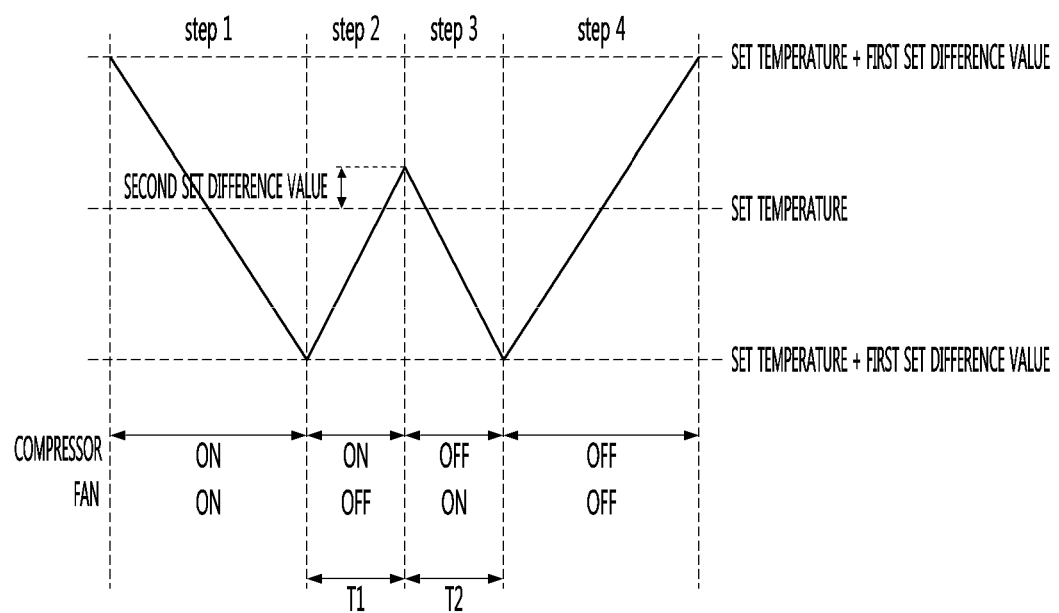
FIG. 7 is a view illustrating a variation in temperature of a storage chamber according to the method for controlling the refrigerator according to the third embodiment of the present invention.

FIG. 6 is a flowchart illustrating a method for controlling a refrigerator according to a third embodiment of the present invention, and FIG. 7 is a view illustrating a variation in temperature of a storage chamber according to the method for controlling the refrigerator according to the third embodiment of the present invention.

Referring to FIGS. 6 and 7, total four steps may be successively performed to maintain a temperature of the storage chamber, which is selected as one of a refrigerating compartment and a freezing compartment, at a constant temperature in this embodiment.

The refrigerator may form one cooling cycle by using a single compressor and a single evaporator.

Alternatively, for example, two compressors and two evaporators may be used to form two cooling cycles.

In this specification, in case in which the storage chamber is the refrigerating compartment, the compressor and a fan may be a compressor for the refrigerating compartment and a fan for the refrigerating compartment. Also, in case in which the storage chamber is the freezing compartment, the compressor and a fan may be a compressor for the freezing compartment and a fan for the freezing compartment.

A control method of the refrigerator according to the present invention may include a first step for driving the compressor compressing a refrigerant and the fan moving air, a second step of driving the compressor and stopping the fan, a third step of stopping the compressor and driving the fan, and a fourth step of stopping the compressor and the fan.

When the fourth step is ended, the first step may be performed just.

In the first step, the storage chamber decreases in temperature, and in the second step, the storage chamber increases in temperature. In the third step, the storage chamber decreases in temperature, and in the fourth step, the storage chamber increases in temperature. Thus, in the control method, the above-described temperature distribution may be realized.

The first step starts when a start condition of the first step is satisfied (S60). The start condition of the first step may represent a temperature (a first reference temperature) obtained by adding a temperature variation range that is allowed at a set temperature of the storage chamber, i.e., a first set difference value. That is, when the temperature of the storage chamber increases by a difference value between a set temperature and a first set temperature, the first step is performed (S62).

Here, the first set temperature difference value may be approximately 0.5.

In the first step, since the compressor is driven, the evaporator may be cooled, and the temperature of the storage chamber may decrease while the air cooled through the evaporator moves to the storage chamber by the fan. Here, the temperature of the storage chamber may be changed in a curved shape rather than a straight line as illustrated in FIG. 7, but it is expressed by a straight line in FIG. 7 for convenience of explanation.

While the first step is performed, it is determined where a start condition of the second step is satisfied (S70). Here, the start condition of the second step is the same as an end condition of the first step. This is done because when the first step is ended, the second step is performed immediately.

The first step may be ended at a temperature (a second reference temperature) of the temperature of the storage chamber, which is obtained by subtracting the first set difference value from the set temperature. That is, the second step may start at a temperature of the storage chamber, which is obtained by subtracting the first set difference value from the set temperature.

Thus, in the first step, the storage chamber may be changed within a range of a temperature obtained by adding the first set difference value to the set temperature and a temperature obtained by subtracting the first set difference value from the set temperature. Here, if the first set difference value is approximately 0.5, in the first step, the temperature may be changed within a range of 1 degree based on the set temperature of the storage chamber.

In the second step, the compressor is maintained to be driven, but the driving of the fan is stopped (S72). Since the compressor is driven, air around the evaporator is cooled at a low temperature in the evaporator. However, since the fan is not driven, most of the air cooled by the evaporator may not move to the storage chamber and be located around the evaporator.

Thus, the temperature of the storage chamber increases relative to the temperature at the beginning of the second step.

While the second step is performed, it is determined where a start condition of the third step is satisfied (S80). Here, the start condition of the third step is the same as an end condition of the first step. This is done because when the second step is ended, the third step is performed immediately.

That is, the second step may be ended when the temperature of the storage chamber reaches a temperature obtained by adding the second set difference value to the set temperature. Here, the second set difference value may increase as an external temperature of the refrigerator increases. The increase in the second set difference value may represent that the performed time of the second step increases.

TABLE 1

| External temperature (° C.) | T < 18 | 18 < T < 22 | 22 < T < 34 | 34 < T |
|---|---|---|---|---|
| Second set difference value | | Decreases <−> Increase | | |

When an external temperature T increases, a more amount of cold air for cooling the storage chamber is required. That is, when the external temperature is high, the compressor has to be further driven to cool the storage chamber at the same temperature.

In the second step, even through the compressor is not driven in the third step, it is necessary to secure sufficient cold air for cooling the storage chamber. Therefore, to accumulate more cold air in the second step, as the external temperature increases, the performed time of the second step has to be longer. For this, the second set difference value may be changed largely from the set temperature and the second set difference value, which are the end conditions of the second step, to end the second step after waiting until the temperature of the storage chamber further increase.

Also, the user tends to be relatively sensitive to noise when the compressor repeats the driving and stopping with frequent cycles. Also, since energy efficiency is deteriorated by repeatedly driving and stopping the compressor, it is preferable that the compressor is stopped after driving enough to avoid driving for a long time after ensuring sufficient cold air after starting the compressor.

As shown in Table 1, the second set difference value may be changed in size with the total four sections. For example, the second set difference value may be selected according to a temperature measured by an external temperature sensor while having only four variation values.

The second set difference value may be less than the first set difference value. That is, the temperature of the storage chamber at the end time point of the second step is preferably less than that of the storage chamber at the start time point of the first step.

It is preferable that the temperature variation range in the first step includes the temperature variation range in the second step so that the temperature variation range of the storage chamber decreases. Thus, the storage chamber may be changed within a narrow range around the set temperature, and the temperature variation range of the storage chamber may be reduced.

It may be determined whether the second step is performed for the first set time T1 as another end condition of the second step (S80).

TABLE 2

| External temperature (° C.) | T < 18 | 18 < T < 22 | 22 < T < 34 | 34 < T |
|---|---|---|---|---|
| First set time (T1) | | Decreases <−> Increase | | |

When the external temperature T increases, a more amount of cold air for cooling the storage chamber is required. That is, when the external temperature is high, the compressor has to be further driven to cool the storage chamber at the same temperature.

In the second step, even through the compressor is not driven in the third step, it is necessary to secure sufficient cold air for cooling the storage chamber. Therefore, to accumulate more cold air in the second step, as the external temperature increases, the performed time of the second step, i.e., a first set time T1 has to be longer.

As shown in Table 2, the first set time may be changed in size with the total four sections. For example, the first set time may be selected according to a temperature measured by the external temperature sensor while having only four change values.

The first set time T1 may be measured by a timer. The timer starts to measure an elapsed time when the second step starts, i.e., the compressor is driven, and the stop of the fan starts, and transmit information about whether the first set time T1 elapses to a control unit.

In the second step, the driving of the compressor is stopped, and the fan is driven (S82). Since the compressor is not driven, the cold air is not generated in the evaporator so that it is difficult to continuously cool air around the evaporator. In the second step, since the air around the evaporator is in the cooled state, when the fan is driven, the cooled air may move to the storage chamber to cool the storage chamber. Thus, as illustrated in FIG. 7, the internal temperature of the storage chamber may decrease.

In the third step, since the compressor is not driven, noise due to the compressor is not generated. Generally, since the noise generated by the compressor is less than that generated by the fan, the noise level in the third step may be less than that in the second step.

While the third step is performed, it is determined where a start condition of the fourth step is satisfied (S90). Here, the start condition of the fourth step is the same as an end condition of the third step. This is done because when the third step is ended, the fourth step is performed immediately.

The third step may be ended when the temperature of the evaporator reaches a specific temperature. The temperature of the evaporator may be measured by a temperature sensor for the evaporator. The specific temperature may represent a temperature at which the sublimation phenomenon of ice formed on the evaporator due to the operation of the fan is generated so that reliability of dew or icing in the storage chamber is not affected. The specific temperature may specifically be 0 degree or more, i.e., a temperature above zero.

Here, the temperature sensor for the evaporator may measure a temperature of the tube through which the refrigerant flows into the evaporator or a temperature of a side of the evaporator.

Also, the third step may be performed and ended during the second set time T2.

TABLE 3

| External temperature (° C.) | T < 18 | 18 < T < 22 | 22 < T < 34 | 34 < T |
|---|---|---|---|---|
| Second set time (T2) | | Decreases <–> Increase | | |

When the external temperature T increases, a more amount of cold air for cooling the storage chamber is required.

That is, when the external temperature is high, the compressor has to be further driven to cool the storage chamber at the same temperature. If it is determined that the external temperature is high in the second step, since the first set time is long, the compressor is driven for a longer time, and more cold air is accumulated. Thus, to sufficiently transfer the cold air accumulated in the second step to the storage chamber in the third step, it is possible to drive the fan for a longer time. That is, since more cold air is contained, the fan is further driven, and the cold air around the evaporator sufficiently moves to the storage chamber to cool the storage chamber.

As shown in Table 3, the second set time may be changed in size with the total four sections. For example, the second set time may be selected according to a temperature measured by the external temperature sensor while having only four change values.

It is also possible that the start condition of the fourth step starts when the temperature of the storage chamber reaches a value obtained by subtracting the first set difference value from the set temperature in addition to the above-mentioned two conditions. Since the related contents are the same as those in the case of starting the second step, detailed description will be omitted.

When the fourth step is performed, since the fan and the compressor are not driven, noise is not generated (S92). On the other hand, since the cold air is not supplied to the storage chamber, the temperature of the storage chamber may increase.

While the fourth step is performed, it is determined where an end condition of the fourth step is satisfied (S100). Here, the end condition of the fourth step is the same as a start condition of the first step. This is done because when the fourth step is ended, the first step is performed immediately.

That is, the fourth step may be ended at a temperature obtained by adding the first set difference value to the set temperature. Thus, the variation range of the internal temperature of the storage chamber may be included in the temperature variation range in the first step.

The temperature variation range in the first step may be the same as the temperature variation range in the fourth step.

In the present invention, since the compressor is driven only in the first stage and the second stage, and the compressor is not driven in the third stage and the fourth stage, the cycle for driving and stopping the compressor may be longer. Thus, the noise due to the driving of the compressor may be reduced.

In addition, since the driving period of the compressor increases, the energy efficiency consumed in operating the compressor may be improved. If the compressor is frequently turned on and off, the power consumed to drive the compressor may increase significantly.

Also, the temperature variation range of the first step includes a temperature variation range in the second step, the third step, and the third step so that the temperature of the storage chamber as a whole is changed within the temperature variation range in the first step. Alternatively, the temperature of the storage chamber may be changed within the temperature variation range in the fourth step. Therefore, the temperature range of the storage chamber may be reduced so that the temperature of the food stored in the storage chamber is maintained within a certain range, and the storage period of the food increases.

Particularly, the storage chamber may be a refrigerator compartment. Since the refrigerator has the temperature above zero as the set temperature, the food is stored at a temperature greater than that of the freezing compartment. Therefore, the food stored in the refrigerator is more sensitive to the temperature variation of the storage chamber than the food stored in the freezing compartment. The control flow described in the present invention may be applied to the refrigerating compartment to reduce the temperature variation range of the refrigerating compartment.

In this specification, although the two embodiments are described separately, but the present invention is not limited thereto, and the contents of the second embodiment may be added to the first embodiment, or two embodiments may be combined with each other.

It is to be understood that the invention is not limited to the disclosed embodiment, but, on the contrary, is intended to cover various modifications and equivalent arrangements included within the spirit and scope of the appended claims.

The invention claimed is:

1. A method for controlling a refrigerator comprising a compressor compressing a refrigerant, a first evaporator receiving the refrigerant from the compressor to generate cold air for cooling a first storage chamber, a first cooling fan for supplying the cold air into the first storage chamber, a second evaporator receiving the refrigerant from the compressor to generate cold air for cooling a second storage chamber, a second cooling fan for supplying the cold air into the second storage chamber, and a valve selectively opening one of a first refrigerant passage connected between the compressor and the first evaporator to allow the refrigerant to flow therebetween and a second refrigerant passage connected between the compressor and the second evaporator to allow the refrigerant to flow therebetween, wherein cooling of the first storage chamber and cooling of the second storage chamber alternately operate, the method comprising:
sensing a temperature of the first storage chamber by a sensor;
increasing, by a controller that is configured to control the temperature of the first storage chamber between a first reference temperature and a second reference temperature greater than the first reference temperature, an output of the first cooling fan based on the sensed temperature of the first storage chamber reaching a value that is equal to or above the first reference temperature for the first storage chamber;
decreasing, by the controller, the output of the first cooling fan or stopping the first cooling fan based on the sensed temperature of the first storage chamber reaching a value that is equal to or below the second reference temperature for the first storage chamber;
increasing, by the controller, the output of the first cooling fan (i) based on a first reference time having elapsed from a time point at which the temperature of the first storage chamber reaches the value that is equal to or below the second reference temperature, or (ii) based on the sensed temperature of the first storage chamber reaching a first set temperature between the first reference temperature and the second reference temperature after the temperature of the first storage chamber reaches the value that is equal to or below the second reference temperature; and
decreasing, by the controller, the output of the first cooling fan or stopping the first cooling fan (i) based on a second reference time having elapsed from a time point at which the output of the first cooling fan is changed, or (ii) based on the sensed temperature of the first storage chamber reaching a second set temperature between the first set temperature and the first reference temperature after the output of the first cooling fan is changed.

2. The method of claim 1, further comprising:
in a state in which the output of the first cooling fan is decreased or the first cooling fan is stopped when the sensed temperature of the first storage chamber reaches the value that is equal to or below the second reference temperature, controlling the valve to maintain an opened state of the first refrigerant passage so that introduction of the refrigerant into the first evaporator is maintained; and
after maintaining the opened state of the first refrigerant passage for a predetermined time, controlling the valve to close the first refrigerant passage and open the second refrigerant passage to increase the output of the second cooling fan.

3. The method of claim 1, further comprising increasing an output of the second cooling fan when the sensed temperature of the first storage chamber reaches the valve that is equal to or below the second reference temperature.

4. The method of claim 3, further comprising:
sensing a temperature of the second storage chamber by the sensor or another sensor;
based on the sensed temperature of the second storage chamber reaching a predetermined temperature after the output of the second cooling fan is increased, decreasing the output of the second cooling fan or stopping the second cooling fan after a set time elapses in a state in which an output of the compressor decreases or the compressor is stopped.

5. The method of claim 3, further comprising:
sensing a temperature of the second storage chamber by the sensor or another sensor;
based on the sensed temperature of the second storage chamber reaching a predetermined temperature after the output of the second cooling fan is increased, decreasing an output of the compressor and the output of the second cooling fan while maintaining the output of the first cooling fan.

6. The method of claim 5, wherein, when the second reference time elapses, or the temperature of the first storage chamber reaches the second set temperature after the output of the compressor decreases, the output of the first cooling fan decreases.

7. The method of claim 6, wherein, when the temperature of the first storage chamber reaches the first set temperature after the output of the first cooling fan decreases, the output of the first cooling fan increases again.

8. The method of claim 1, wherein the first set temperature is greater than a set target temperature of the first storage chamber, and
wherein the second set temperature is less than the target temperature of the first storage chamber.

9. The method of claim 8, wherein a difference between the first set temperature and the target temperature is less than a difference between the second set temperature and the target temperature.

10. The method of claim 1, further comprising increasing the second reference time based on an increase of a number of times of turn-on operations of the first cooling fan.

11. The method of claim 1, further comprising:
after the temperature of the first storage chamber reaches the value that is equal to or below the second reference temperature, determining a temperature of the first evaporator by the sensor or another sensor, or a number of times of operation of the first cooling fan or adjustment of the output of the first cooling fan in a state in which the first cooling fan is rotating, in a state in which the output of the first cooling fan decreases after the output of the first cooling fan is increased, or in a state in which the first cooling fan is stopped.

12. The method of claim 11, further comprising:
stopping control of the output of the first cooling fan based on the temperature of the first evaporator reaching a predetermined temperature or the number of times of operation of the first cooling fan or adjustment of the output of the first cooling fan reaching a predetermined reference number.

13. The method of claim 1, wherein sensing the temperature of the first storage chamber comprises sensing the temperature of the first storage chamber by a first temperature sensor, and
wherein the method further comprises:
sensing a temperature of the second storage chamber by a second temperature sensor, and
sensing a temperature of the first evaporator by an evaporator temperature sensor.

14. The method of claim 1, wherein the first reference temperature, the second reference temperature, the first set temperature, and the second set temperature are preset temperatures, and
wherein the first set temperature is greater than a preset target temperature of the first storage chamber, and the second set temperature is less than the preset target temperature of the first storage chamber.

15. The method of claim 1, wherein increasing the output of the first cooling fan based on the sensed temperature of the first storage chamber reaching the value that is equal to or above the first reference temperature for the first storage chamber comprises:
turning on the first cooling fan based on the sensed temperature of the first storage chamber being less than or equal to the second reference temperature, and
wherein decreasing the output of the first cooling fan or stopping the first cooling fan based on the sensed temperature of the first storage chamber reaching the value that is equal to or below the second reference temperature for the first storage chamber comprises:
turning off the first cooling fan based on the sensed temperature of the first storage chamber being equal to the first reference temperature.

16. The method of claim 15, further comprising:
maintaining the first cooling fan in an off-state for the first reference time; and
after maintaining the first cooling fan in the off-state for the first reference time, turning on the first cooling fan for the second reference time.

\* \* \* \* \*